(12) United States Patent
Benson

(10) Patent No.: US 9,111,279 B2
(45) Date of Patent: Aug. 18, 2015

(54) SYSTEM AND METHOD FOR GENERATING AND DELIVERING PERSONALIZED CONTENT

(75) Inventor: Gregory P. Benson, Rancho Santa Fe, CA (US)

(73) Assignee: Glenbrook Associates, Inc., Rancho Santa Fe, CA (US)

( * ) Notice: Subject to any disclaimer, the term of this patent is extended or adjusted under 35 U.S.C. 154(b) by 763 days.

(21) Appl. No.: 11/703,285

(22) Filed: Feb. 7, 2007

(65) Prior Publication Data

US 2007/0204301 A1 Aug. 30, 2007

Related U.S. Application Data

(63) Continuation of application No. PCT/US2007/001784, filed on Jan. 22, 2007.

(60) Provisional application No. 60/761,189, filed on Jan. 23, 2006.

(51) Int. Cl.
| | |
|---|---|
| H04N 7/10 | (2006.01) |
| H04N 7/025 | (2006.01) |
| G06Q 30/00 | (2012.01) |
| H04H 20/10 | (2008.01) |
| H04H 20/38 | (2008.01) |
| H04H 60/07 | (2008.01) |
| H04H 60/22 | (2008.01) |
| H04H 60/31 | (2008.01) |
| H04H 60/46 | (2008.01) |
| H04H 60/66 | (2008.01) |
| H04N 7/173 | (2011.01) |
| H04N 21/258 | (2011.01) |
| H04N 21/2668 | (2011.01) |
| H04N 21/475 | (2011.01) |
| H04N 21/658 | (2011.01) |
| H04N 21/81 | (2011.01) |
| H04H 60/40 | (2008.01) |

(52) U.S. Cl.
CPC .......... *G06Q 30/00* (2013.01); *H04H 20/103* (2013.01); *H04H 20/38* (2013.01); *H04H 60/07* (2013.01); *H04H 60/22* (2013.01); *H04H 60/31* (2013.01); *H04H 60/46* (2013.01); *H04H 60/66* (2013.01); *H04N 7/17318* (2013.01); *H04N 21/25891* (2013.01); *H04N 21/2668* (2013.01); *H04N 21/4758* (2013.01); *H04N 21/6582* (2013.01); *H04N 21/812* (2013.01); *H04H 60/40* (2013.01)

(58) Field of Classification Search
CPC .................. H04N 21/23424; H04N 21/26241; H04N 21/4316; H04N 21/4331; H04N 21/454; H04N 21/458; H04N 21/812; H04N 21/232; H04N 21/25841; H04N 21/2668; H04N 21/4524; H04N 21/25883; H04N 21/64784; H04N 21/6402; H04N 21/64792
USPC ................... 725/46, 9, 34, 35, 36, 27, 41–43; 705/14; 709/219; 455/432.3
See application file for complete search history.

(56) References Cited

U.S. PATENT DOCUMENTS

| | | | |
|---|---|---|---|
| 6,374,237 B1 | 4/2002 | Reese | |
| 6,760,916 B2 * | 7/2004 | Holtz et al. | 725/34 |

(Continued)

FOREIGN PATENT DOCUMENTS

WO    WO 01/54403 A1    7/2001

OTHER PUBLICATIONS

The International Search Report for corresponding PCT Application No. PCT/US07/001784, mailed on Feb. 19, 2008.

*Primary Examiner* — Nasser Goodarzi
*Assistant Examiner* — An Nguyen
(74) *Attorney, Agent, or Firm* — Knobbe Martens Olson & Bear LLP

(57) ABSTRACT

A media system configured to select personalized programming for individual users is disclosed. The programming may include content, advertisements, and/or interactive queries, each of which may be selected based on profiles of the users.

47 Claims, 5 Drawing Sheets

(56) References Cited

U.S. PATENT DOCUMENTS

| | | |
|---|---|---|
| 6,950,804 B2 | 9/2005 | Strietzel |
| 7,660,581 B2 * | 2/2010 | Ramer et al. ............... 455/432.3 |
| 8,161,509 B2 * | 4/2012 | Takatori ......................... 725/36 |
| 2002/0042914 A1 * | 4/2002 | Walker et al. .................. 725/36 |
| 2002/0147645 A1 * | 10/2002 | Alao et al. ...................... 705/14 |
| 2002/0183059 A1 | 12/2002 | Noreen et al. |
| 2003/0151621 A1 * | 8/2003 | McEvilly et al. ............. 345/744 |
| 2003/0191816 A1 * | 10/2003 | Landress et al. ............. 709/219 |
| 2003/0216961 A1 * | 11/2003 | Barry ............................. 705/14 |
| 2004/0078809 A1 * | 4/2004 | Drazin ........................... 725/34 |
| 2004/0093394 A1 | 5/2004 | Weber et al. |
| 2004/0111467 A1 * | 6/2004 | Willis .......................... 709/203 |
| 2004/0117828 A1 | 6/2004 | Parker et al. |
| 2004/0137416 A1 | 7/2004 | Ma et al. |
| 2004/0163101 A1 * | 8/2004 | Swix et al. ....................... 725/9 |
| 2004/0226051 A1 | 11/2004 | Carney et al. |
| 2007/0107010 A1 * | 5/2007 | Jolna et al. ..................... 725/34 |
| 2010/0257561 A1 * | 10/2010 | Maissel et al. ................. 725/41 |

* cited by examiner

SYSTEM AND METHOD FOR GENERATING AND DELIVERING PERSONALIZED CONTENT

CROSS-REFERENCE TO RELATED APPLICATIONS

This application claims priority to and is a continuation of PCT International Application Number PCT/US2007/01784, filed on Jan. 22, 2007, designating the United States of America and published in the English language, which claims priority under 35 U.S.C. §119 to U.S. Provisional Application No. 60/761,189, filed on Jan. 23, 2006. The disclosures of the above-described applications are hereby expressly incorporated by reference in their entireties.

BACKGROUND

1. Field of the Invention

The field relates to distribution of media content, advertisements, and interactive queries related to the media content and the advertisements.

The broadcasting and media industries have remained virtually unchanged since their birth with regard to how programming content is packaged and delivered. Until recently, there was little choice but to create a single program for delivery to a mass audience. Not only did this approach fail to satisfy individual desires of the consuming public but it also forced advertisers into paying for generic spots to appeal to a broad audience with little means of understanding the effectiveness of the spot.

2. Description of the Related Technology

Media revenue for various media outlets is often generated through advertisements, where media content, for example, music, sports, movies, news, entertainment, dialog, commentary, interviews, DJs, and hosts is provided to a user along with advertisements, for which the advertiser pays the media distributor. Various media distributors, such as television, radio, newspaper, magazine, and computer network programming, operate with this business model. The media content is generally provided to a large number of users, who have an interest in the content being provided. The advertisements are packaged with the content and the integrated content and advertisements are delivered to the user. Demographic data, such as age, and income, and the number of users which receive the media and advertisements are used by advertisers to determine advertisement value of the media programming and the various outlets. Advertisers making decisions about where to spend their budget base their decisions on the values of the various media programming options. Accordingly, in order to attract the most advertising revenue, media distributors attempt to provide media content which will attract large numbers of users. In addition, media distributors attempt to provide accurate demographic data about the population of users. In order to maximize advertisement value, some media distribution systems attempt to provide programming and advertisements based on preferences of individual users.

Additionally, or alternatively, media distributors may collect revenue from users based on user exposure to the media. Many cable television systems provide their customers with pay-per-view services, where a customer optionally selects to watch a program, and is charged a fee based on the selection. Similarly, network distribution of music often uses a fee based model. The user selects music content to download, pays a fee, and downloads the music. Once, downloaded, however, the music provider is unaware of the user's use of the music.

SUMMARY OF CERTAIN INVENTIVE ASPECTS

The media delivery system of the present invention has several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the features of this invention provide advantages.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Recent developments in communications, consumer electronics and media production are now poised to enable the production and delivery of truly personalized content tailored to individual preferences as well as context sensitive variables such as time and location.

Not only does such a development represent a quantum improvement in the programming choices available to consumers, but advertisers will now have the power to narrowly target messages to consumers who are pre-qualified and receptive to information and offers for specific goods and services. Embodiments described here will not only lead to higher consumer satisfaction but also to a dramatic improvement in the performance of advertising messages and an associated rise in cost-effectiveness for the advertising dollar.

A media system configured to select personalized programming for individual users is discussed. The programming may include content, advertisements, and/or interactive queries, each of which may be selected based on profiles of the users, the contents, advertisements and/or queries.

Figure 1:
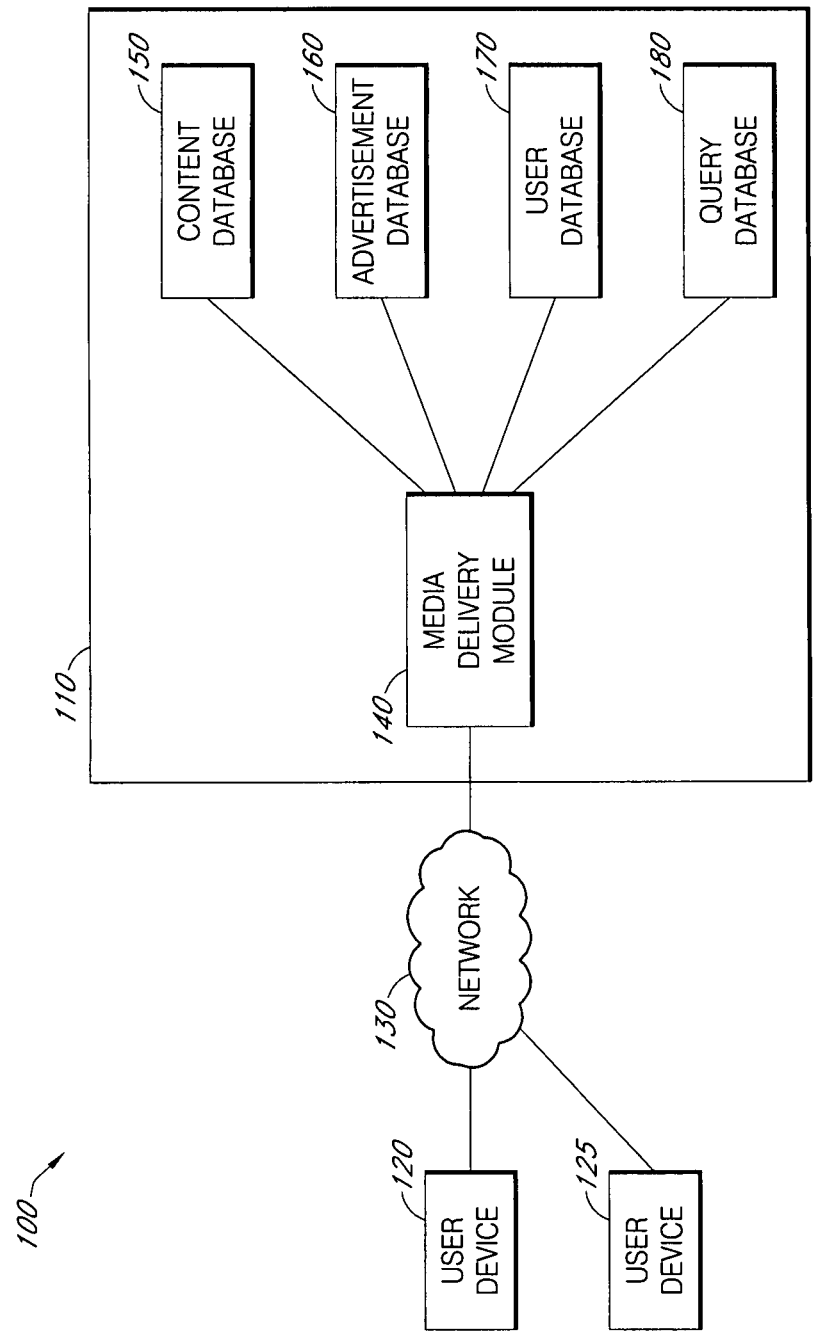
FIG. 1 is a block diagram of a media system.

FIG. 1 is a block diagram of a media system 100. The media system 100 has a media delivery system 110 in communication with user devices 120 and 125 via communication network 130.

The user devices 120 and 125 can each be any media presentation device. For example, user devices 120 and 125 can each be a personal computer, a television, a radio, an mp3 player, a cell phone, a PDA, a CD player, and/or a portable DVD player. The devices 120 and 125 are configured to present media to a user, and may be considered portable or stationary. The devices 120 and 125 are configured to connect to communications network 130. Some user devices 120 and 125 have a memory configured to store the media to be presented. Some user devices 120 and 125 are configured to receive the media and substantially immediately present the media. Some user devices 120 and 125 are configured to transmit information to the media delivery system 110.

The communication network 130 can be any type of communication network. For example communication network 130 can be wired or wireless, and may use any type of communication protocol. For example, the network 130 may be one or more of the following types of networks: television cable, telephone/Internet, microwave, cellular phone or radio.

The media delivery system 110 has a media delivery module 140, a content database 150, an advertisement database 160, a user database 170, and in some embodiments media delivery system 110 has a query database 180. In some embodiments, the media delivery system 110 is configured to receive inputs from the users.

The user database 170 has user profiles with information related to potential and/or actual users of the media system 100. The information may include, for example, user preferences such as, preferences related to content (e.g. favorite artists, specific programs, program genres, DJ's, hosts, topics, etc), language (e.g. English, Spanish, German), time of transmission, personal interests (e.g. golf, stock market, religion), product or service interests (e.g. new house, new refrigerator, carpet cleaning, car maintenance), products currently owned by the user (e.g. food, clothing, automobiles, music, etc.), or personal economic data (e.g. previous financial transactions, credit history, banking information, etc). In some embodiments, the information may include combinations of preferences. For example, a user may prefer a certain genre of music in the morning, prefer financial news and talk in the afternoon, and prefer sports on weekends. Similarly, a user may prefer to watch football games with English commentators, and to follow a continuing education course in his native language.

In some embodiments, the information of the profile is accumulated with active participation of the user, such as the user filling out a questionnaire, or by passive participation of the user, such as by monitoring and recording the activities of the user device 120. Other mechanisms for collecting the information may also be used. The information of the profile may be entered by the user with the user device 120, or by another device, such as a computer connected to a network. In some embodiments, at least some of the information of the profile is generated by the media delivery system 110 based on other collected information.

The content database 150 has information related to programming content. Programming content may, for example, include songs, movies, pictures, interviews, monolog, dialog, audio, video, books, or web-pages. In some embodiments, content database 150 stores the programming content. Additionally, the content may be of a variety of formats. For example, they may be digital, analog, or multi-media data. In some embodiments, content database 150 alternatively or additionally has links to programming content. In some embodiments, content database 150 has profile data associated with the programming content, such as program genre, length, date of publication, language, and ratings from users. In some embodiments, content database 150 has program options, such as which host for a talk show, available languages, and national or local news. The content database 150 may contain unconventionally small, granular portions of media content that, once personal selections are made, will be aggregated into a conventional media program. For example, the media delivery system 110 might determine that the user would prefer to receive a certain advertisement with video clip A, background music B, and announcer language C followed by query X in language C.

In some embodiments, the information of the content database is accumulated with active participation of the owner or of a user of the content, such as the user filling out a questionnaire or the user inputting an opinion about the content, or by passive participation of the user, such as by monitoring and recording the activities of the user device 120. Other mechanisms for collecting the information may also be used. The information of the content database may be entered by the owner or a user with a user device 120, or by another device, such as another computer connected to a network. In some embodiments, at least some of the information of the content database is generated by the media delivery system 110 based on other collected information.

The advertisement database 160 has information related to advertisements. In some embodiments, advertisement database 160 stores the advertisements. In some embodiments, advertisement database 160 alternatively or additionally has links to advertisements. In some embodiments, advertisement database 160 has a profile for each of the advertisements, each profile having data associated with the associated advertisement, such as product or service type, brand, company, store location, store hours of operation. It may also include information about what user demographic is best suited to its message or the actual response rate being experience by a certain demographic of user. Such information could then influence subsequent placement of that advertisement. Advertisers may indicate in their profiles whether they want to participate in an auction system that places advertisements based upon this type of dynamic market feedback.

In some embodiments, the information of the advertisement database 160 is accumulated with active participation of the advertiser or of a user of the content, such as the advertiser filling out a questionnaire or the user inputting an opinion about the advertisement, or by passive participation of the user, such as by monitoring and recording user responses to a query related to the advertisement. Other mechanisms for collecting the information may also be used. The information of the advertisement database may be entered by the advertiser or a user with a user device 120, or by another device, such as another computer connected to a network. In some embodiments, at least some of the information of the advertisement database is generated by the media delivery system 110 based on other collected information.

In some embodiments, the media delivery system 110 is configured to be interactive and may have a query database 180. The queries in the query database 180 may be used with interactive media systems. In such systems, the query may be sent to one or more users. Users with user devices 120 configured to transmit data to the media delivery system 110 can respond to the sent queries with input to the media delivery system 110. The media delivery system 110 may be configured to respond to the user input in various ways. This will be further discussed below. The query database 180 may comprise queries, which are data to be presented to the user to which the user may respond. For example, a query may be associated with an advertisement. A query associated with an advertisement may include a prompt for a user to request more information, or to purchase the product or service advertised. Other advertisement related queries are also possible. Queries may be associated with the content. For example, a query associated with the content may prompt a user to input an opinion related to the content or to the topic of the content. Other content related queries are also possible. Some queries may not be specifically related to the advertisements or to the content. For example, such a query may prompt a user to input traffic conditions at the user's current location. Other queries not related to content or to advertisements are possible. Some queries may be related to both content and to one or more advertisements.

The media delivery module 140 is configured to receive information from the content database 150, the advertisement database 160, the user database 170, and may be configured to receive information from a query database 180. In some embodiments, the media delivery module 140 may be further configured to transmit information to any of the content database 150, the advertisement database 160, the user database 170, and the query database 180.

The media delivery system 110 is configured to provide a more enjoyable experience for the users of the system by providing personalized programming components (e.g. content, advertisements and queries). By selecting the programming components based on the preferences of the user, the media delivery system 110 provides better service to its customers and better value for its advertisers. As a result, the media delivery system 110 can generate increased revenue.

Figure 2:
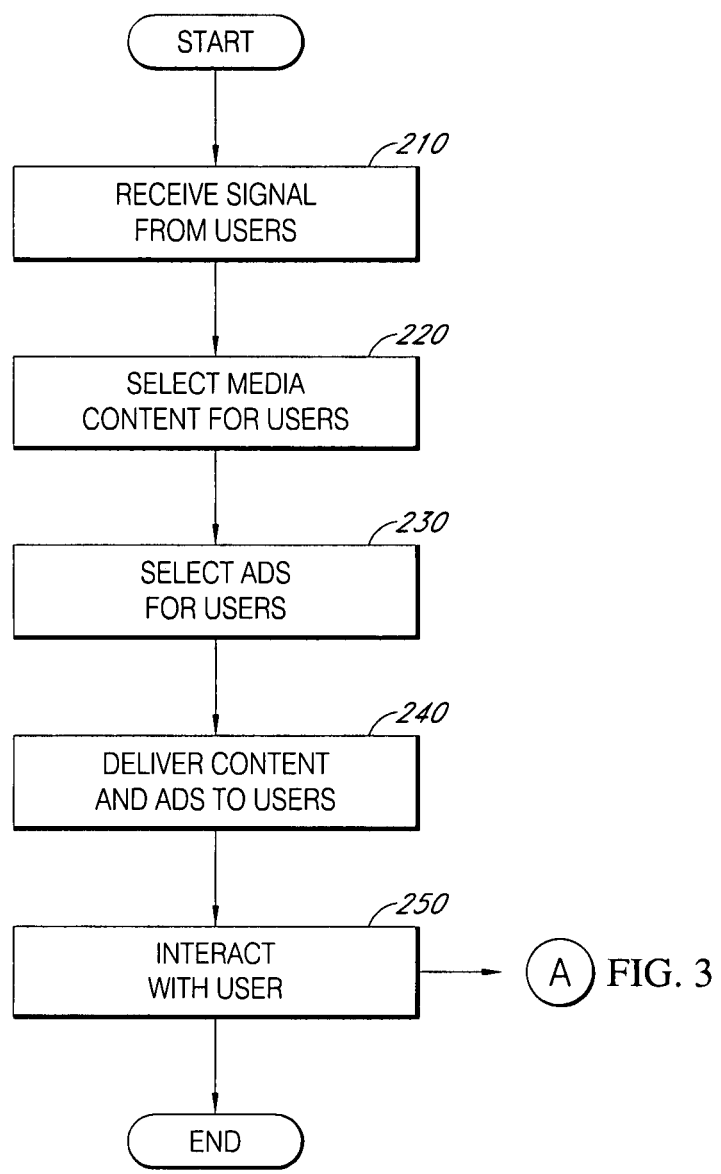
FIG. 2 is a flowchart illustrating a method of media content and advertisement selection and delivery.

FIG. 2 is a flowchart illustrating a method of media content and advertisement selection and delivery using the media system 100 of FIG. 1 with a single user with user device 120. Depending on the embodiment, steps may be added, rearranged, combined, or removed without departing from the invention.

In step 210 the media delivery system 110 receives a signal from the user device 120, the signal being generated in response to an action from the user. In some embodiments, the action may be the user turning on the user device 120. In some embodiments, the action may be the user inputting to the user device an indication that the user is requesting that the signal be transmitted to the media delivery system 110. In response to the signal, the media delivery system 110 is configured to select media content and one or more advertisements for the user.

Next, in step 220 the media delivery module 140 identifies the user based on the received signal, and retrieves data for the user from the user database 170 and or the user device 120. The media delivery module 140 also accesses the content database 150. Based at least in part on the data for the user retrieved from the user database 170 and on the data accessed from the content database 150, the media delivery module 140 selects media content for the user from the content database 150. The selection of the content may be made, for example, based at least in part on a comparison of data from the user profile from the user database 170 with data associated with the content. For example, the user profile may have preference data indicating that the user likes to hear traffic information in the morning. Based on the user preference and the time of day, the media delivery module 140 may select a media content with traffic information. In some embodiments, the user device 120 may communicate a current location to the media delivery module 140, and the media delivery module 140 may select the media content with the traffic information based also on the current location. In some embodiments, the user selects the content by, for example by choosing from a list of currently available content.

Then, in step 230 the media delivery module 140 accesses the advertisement database 160. Based at least in part on the data for the user retrieved from the user database 170 and on the data accessed from the advertisement database 160, the media delivery module 140 selects an advertisement for the user from the advertisement database 160. The selection of the advertisement may be made, for example, based at least in part on a comparison of data from the user profile from the user database 170 with data associated with one or more advertisements in the advertisement database 160. For example, the user profile may have preference data indicating that the user is interested in buying a new car. Based on the user preference, the media delivery module 140 may select an advertisement from a local car dealership. In some embodiments, the delivery module 140 selects the advertisement based at least in part on the current content. For example, if the current content is a movie with a BMW, the advertisement may be from a BMW dealership. In some embodiments, the delivery module 140 may select the advertisement based also on the current user location.

Proceeding to step 240 the media delivery module 140 transmits the selected media content and the selected advertisement to the user device. Thus the media delivery system 110 is configured to offer personalized programming for its users. In some embodiments, the user device 120 is configured to transmit a signal each time a user is presented with a specific content or advertisement. The media delivery system 110 may use this information to bill users for use or advertisers for delivery. Additionally, the system may record the information in the user database 170, the advertisement database 160 or a separate database for the purpose of auditing use or determining patterns. In one embodiment, the system would provide regular reports to ASCAP for the purpose of copyright compliance.

In some embodiments, the media delivery module 140 and the user device 120 are both configured for interactive communication. This will be further discussed with reference to FIG. 3.

The method and system of FIGS. 1 and 2 may simultaneously operate for a plurality of users. For example, first and second users with user devices 120 and 125, respectively, may both initiate signals to be transmitted to the media delivery system 110. In step 210 the media delivery system 110 receives both signals. The difference in time at which the signals are received is not significant. For example, the signals may be received simultaneously, substantially simultaneously, minutes apart, or hours apart. Then, in step 220 the media delivery module 140 selects media content for each of the first and second users based on methodology similar or substantially identical to that discussed above. Next, in step 230 the media delivery module 140 selects advertisements for each of the first and second users based on methodology similar or substantially identical to that discussed above. Proceeding to step 240 the media delivery module 140 transmits the media content and the advertisement selected for the first user to the user device 120 of the first user, and transmits the media content and the advertisement selected for the second user to the user device 125 of the second user. The difference in time at which each of the steps 210, 220, 230, 240, and optionally 250 occur for each of the first and second users is not significant. For example, the step 230 for the first user may occur substantially simultaneously, minutes before, or hours after step 230 for the second user.

Figure 3:
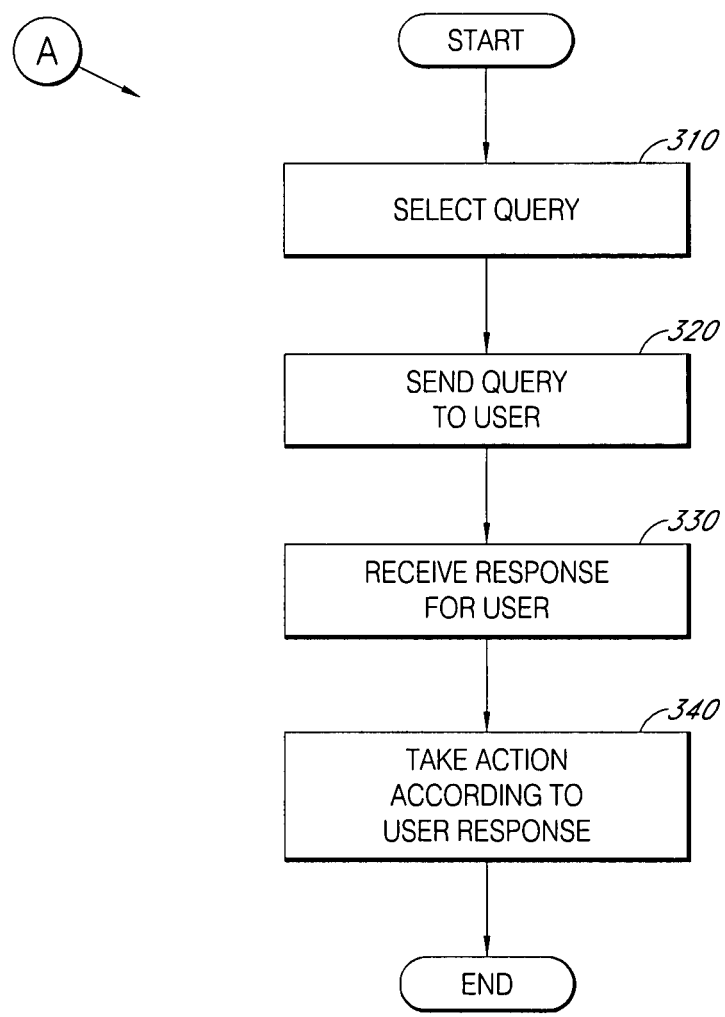
FIG. 3 is a flowchart illustrating a method of an interactive media system.

FIG. 3 is a flowchart illustrating a method of an interactive media delivery system. The interactivity improves the system by providing interactive queries to which the user may respond. The interactive nature of the system allows for dynamic selection of program components, as well as real time interaction with the user. Depending on the embodiment, steps may be added, rearranged, combined, or removed without departing from the invention.

For simplicity, the description here is directed to use of the method with a single user, however, the system can be used simultaneously with any number of users, with each user at an arbitrary step in the method. In step 310, the media delivery module 140 accesses the query database 180. Based at least in part on the data for the user retrieved from the user database 170, the advertisement database 160, and on the data accessed from the query database 180, the media delivery module 140 selects a query for the user from the query database 180. The selection of the query may be made, for example, based at least in part on a comparison of data from the user profile from the user database 170 with data associated with one or more queries in the query database 180. A query may alternatively or additionally be selected based at least in part on information transmitted from the user device 120, such as current location, or on global information, such as time.

In step 320, the media delivery module 140 sends the selected query to the user device 120. The user device presents the query to the user. The user may choose to enter a response to the user device 120, which is configured to send the response as input to the media delivery system 110. Then, in step 330, the media delivery system 110 receives the input. In some embodiments where a user does not have a device capable of transmitting a reply, the user would be presented with alternate means of sending a reply such as calling a certain phone number or sending an email message.

Proceeding to step 340, the media delivery system 110 performs an action in response to the input. In some embodiments, the action comprises recording data related to the input in the profile of the user. The media delivery system 110 may be configured to track inputs for each user to better characterize the user. The tracked inputs may be used to continuously improve the selection process for at least one of media content, advertisements, and queries to be presented to the user, thereby providing better service to the user and increasing the value of the advertisements. The media delivery system 110 may be configured to track inputs from a plurality of system users in aggregate. For example, an analysis of the aggregate data may find a correlation between users who prefer to receive financial news before 7am and those who respond positively to a query related to an advertisement for a financial magazine offering a free copy. In some embodiments, the action may comprise interacting with another system. For example, a query related to program content may ask for an opinion related to the content, and the media delivery system 110 may transmit the responses to a system designated by the creator of the content.

In one scenario, the user device 120 may transmit a current location of the user to the media delivery system 110 and the profile of the user may have preference data indicating that the user likes a particular fast food restaurant. Based at least in part on the user preference, and on the location of the user, the media delivery module 140 may select a query related to the fast food restaurant. The query may comprise a question as to whether the user would like to see a map location of the fast food restaurant. When the user device 120 transmits a proper response to the media delivery system 110, the media delivery module 140 selects and transmits the map location to the user device 120, which presents the map location to the user. In some embodiments, a further query may comprise a prompt for the user to make an order. In response, the user may enter an order into the user device 120, which transmits the order to the media delivery system 110. The media delivery system 110 then transmits the order to the restaurant, which prepares the order so that it is ready when the user arrives at the restaurant. The advertisement database 160 may be configured to provide the user with a discount for accepting a special offer or create an accounting entry in the user database 170 which may later be redeemed for products, barter or cash.

In some embodiments, the system has a usage module, configured to track usage by receiving usage data from a user device. The usage data may indicate any of a time, a date and a location when contents, advertisements, or queries are presented to the user. In some embodiments, the usage module is configured to receive data from multiple users over a period of time, and to determine aggregate usage for at least a portion of the users. A billing module may be configured to calculate billing information based on the usage data. The billing information may be for a user, if the user has a pay-per-usage type arrangement. The billing may also be for an advertiser, which may have an arrangement for billing based on the total number of presentations of an advertisement. Additionally, the system may build an archive of usage data for the purpose of data mining to create detailed demographic reports indicating the relative performance of users, advertisements, queries or an aggregation of these factors.

Figure 4A:
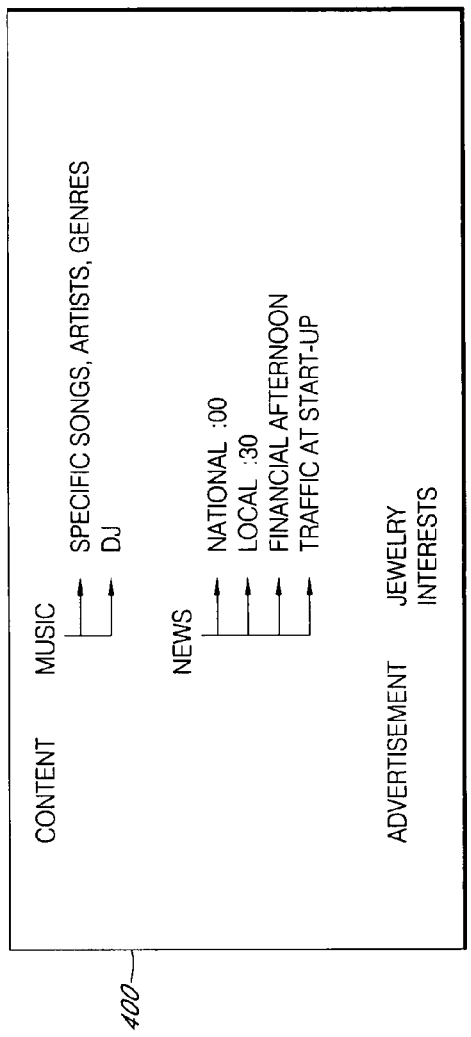
FIGS. 4A and 4B are a system overview perspective of one embodiment.

FIGS. 4A is a representation of an example of a profile 400 of a user. In this embodiment, the user has certain content preferences and certain advertisement preferences. Other preferences may also be included in a user profile, such as query preferences, which relate to user information on which query selection can be based. FIG. 4A shows profile 400 with preferences related to radio programming. The user profile 400 may additionally or alternatively containing preferences related to other media distribution types, such as television, and pod-cast. The profile 400 has content preferences related to music, which includes a list of specific songs, artists, and genres which the user enjoys. Some music preferences may relate to music information, such as an interview with an artist. The profile 400 also has content preferences related to news, which includes types of news and preferred times for each type. For example, the profile 400 may contain data indicating that the user would like to have 2 minutes of national news on the hour, and 2 minutes of local news on the half-hour. Additionally or alternatively the user may prefer to have financial news in the afternoon, and may prefer to have traffic news when the user device 120 first connects to the media delivery system 110. The profile 400 has advertisement preferences related to current purchasing interests of the user, such as wanting to buy jewelry, and general interests of the user, such as sports and unusual restaurants. The profile 400 may also store information about products currently owned or used by the user including previous retail or banking transactions.

Figure 4B:
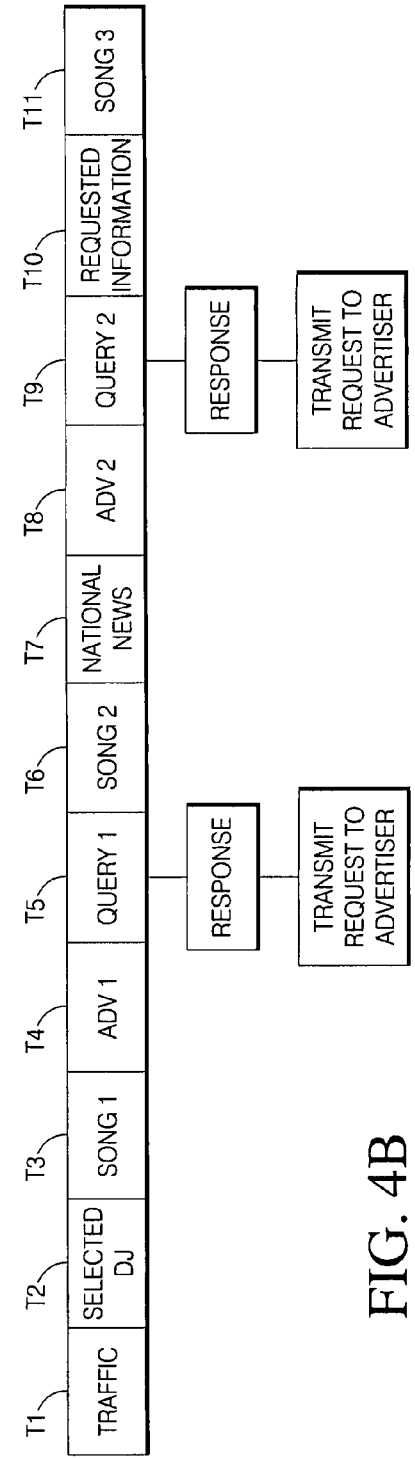

FIG. 4B is a representation of an example of the media content, advertisements and queries transmitted to the user based at least in part on the user profile of FIG. 4A. During timeslot t1, in accordance with the user preference indicating that the user prefers to have a traffic report at start up, a traffic report for his commute route is transmitted to the user device 120. During timeslots t2 a DJ selected by the user is transmitted, and during t3, a song selected from the user's own favorites list transmitted. During timeslots t4 and t5 an advertisement for a Finnish restaurant is transmitted with a query prompting the user to respond if the user would like a copy of the menu emailed to the user. The user responds to the query, and the media delivery system 110 communicates with the advertiser so that the user receives the restaurant menu via email. During timeslot t6, a song from an artist selected by the user is transmitted. During timeslot t7 national news is transmitted in his mother tongue of Korean, in accordance with the preference that national news be received on the hour. During timeslots t8 and t9 an advertisement for a local jewelry store and a query prompting the user to respond if the user would like to receive directions to the store or to have sale information mailed to the user's home. In this example, the user's profile indicates that he is engaged and in the market for a ring. The user requests both the directions and the sale information. Accordingly, the media delivery system 110 communicates the request for the sale information to the advertiser.

During timeslot t10, the directions are transmitted to the user device 120. During timeslot t11, a song from the list of music genres from the user profile is transmitted. In some embodiments, the complexity of program aggregation may warrant the use of multi-track authoring and playback platforms such as Apple QuickTime or Microsoft Windows Media in order to interleave video, audio, music and text according to the user preferences.

The example of FIGS. 4A and 4B is an example of the system transmitting and interacting live with the user. In other examples, the media delivery system 110 may have an authoring module configured to be used by an author to select content, advertisements, and optionally queries occupying numerous timeslots based on methodologies discussed above, and a packaging module configured to generate a program having the selected programming components. In some embodiments, the media delivery system 110 may also have a storage module configured to store the program in a location accessible by the user for download. Despite not being generated in real time, the downloaded program may contain queries to which the user may respond. In some embodiments, the user device 120 may be configured to transmit the user responses to the media delivery system 110 during the program presentation. In some embodiments, the user device 120 may be configured to additionally or alternatively transmit the responses to the queries at another time. This may be particularly advantageous for circumstances when the user device 120 is not connected to the network 130. The user device 120 may present the program, including queries, may store the responses, and transmit the responses to the media delivery system 110 at a later time, when again connected to the network 130.

Figure 5:
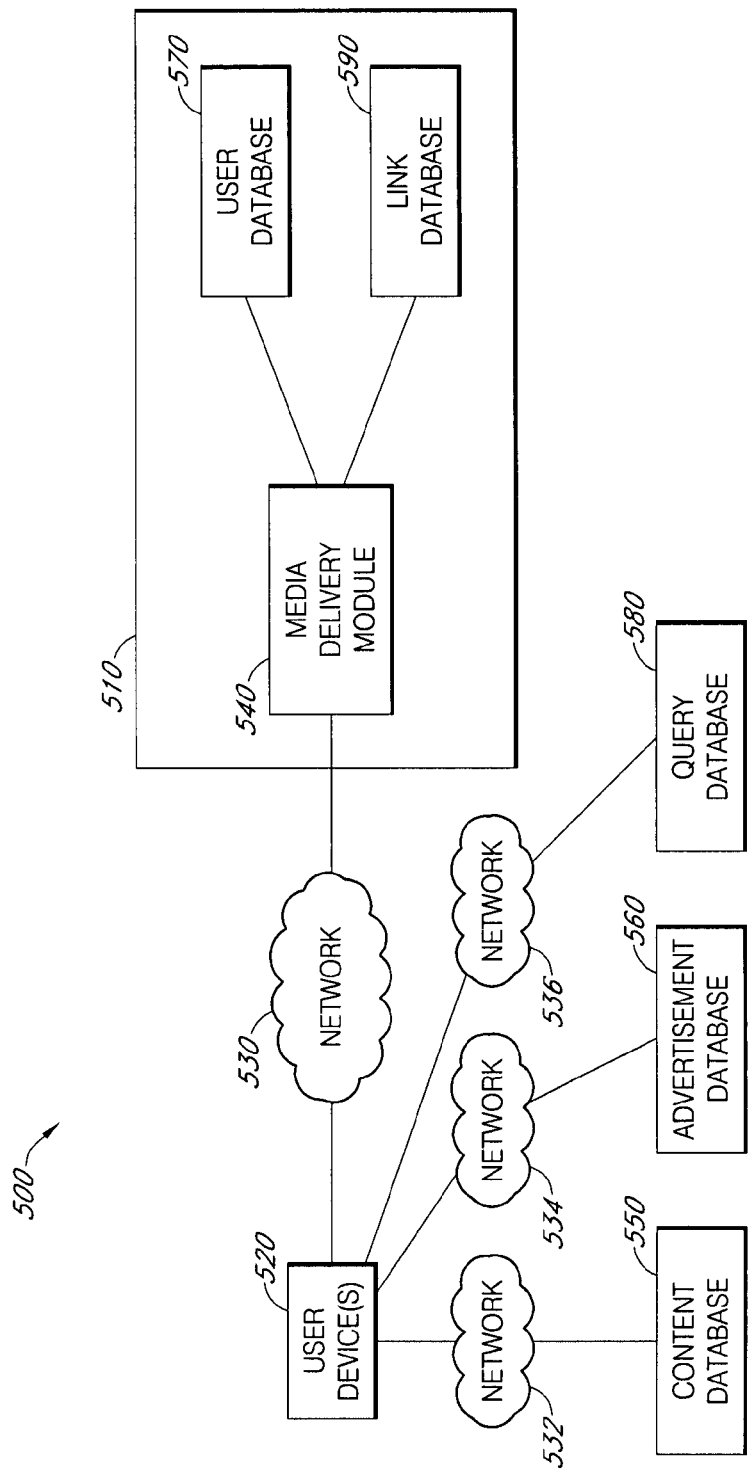
FIG. 5 is a block diagram of a media system.

FIG. 5 is a block diagram of a media system 500. The media system 500 has a media delivery system 510 in communication with at least one user device 520 via communication network 530. User device 520 and communication network 530 may be similar to user device 120 and communication network 130 of FIG. 1.

Media delivery system 510 has media delivery module 540, user database 570 and link database 590. User database 570 may be similar to user database 170 of FIG. 1.

Link database 590 may have similar data as any of content database 150, advertisement database 160, and query database 180 of FIG. 1. Alternatively, link database 590 may not have the data for the user device 520 to present to the user, but instead has links to the data.

Media delivery module 540 may function similarly to the function of media delivery module 140 of FIG. 1. However, media delivery module 540 may be configured to transmit links for selected content, advertisements, and queries to user device 520.

Content database 550 may be similar to content database 150 of FIG. 1, and is configured to communicate with user device 520 at least to deliver content to user device 520. In some embodiments, content database 550 is further configured to communicate with media delivery system 510. Advertisement database 560 may be similar to advertisement database 160 of FIG. 1, and is configured to communicate with user device 520 at least to deliver advertisements to user device 520. In some embodiments, advertisement database 560 is further configured to communicate with media delivery system 510. Query database 550 may be similar to query database 150 of FIG. 1, and is configured to communicate with user device 520 at least to deliver queries to user device 520. In some embodiments, query database 580 is further configured to communicate with media delivery system 510.

In some embodiments, the content, advertisements, and/or queries of the corresponding database may be updated before or after transmission of the links from the media delivery system 510 to the user device 520.

User device 520 may be configured to receive links from the media delivery system 510 and to retrieve the data for presentation from locations indicated by the links. Accordingly, user device 520 is configured to communicate with content database 550 through communications network 532, to communicate with advertisement database 560 through communications network 534, and to communicate with query database 580 through communications network 536. In some embodiments, two or more of networks 530, 532, 534, and 536 are the same network.

In some embodiments, user device 520 is configured to store media content, advertisements, or queries in a memory. Accordingly, the user device 520 may be configured to retrieve media content, advertisements, and/or queries from any of the media delivery system 510, the user device memory, the content database 550, the advertisement database 560, and the query database 580.

In some embodiments, the user device 120 or 520 may have a media selection module configured to perform selection operations as described above with reference to media delivery modules 140 and 540. The user device may have a profile module with a profile of one or more users. In some embodiments, the user device may also have any of a content database, an advertisement database, and a query database. In some embodiments, the user device has a link database comprising links to any of contents, advertisements, and queries.

In some embodiments, the media delivery system 110 or 510 may be configured to communicate with an authoring module (not shown). The authoring module allows an author to easily create personalized programming. The authoring module is configured to allow the user to add or remove content, advertisements and queries to or from the content database, advertisement database, and query database, respectively. The author may modify profile information of the content, advertisements, and queries. The authoring module is configured to allow the author to define and modify selection criteria and rules used by the media delivery module to select program components. For example, the selection criteria for advertisements may be based on values determined for each advertisement for each user. The values may be based on weighted components, such that, for example, a strong match in a user's current buying interest increases the likelihood that the advertisement is selected more than a strong match in general interests of the user. In some embodiments, the authoring module may allow the author to receive data related to user responses to queries or to generate accounting entries for the purpose of compensating the author for user consumption of the author's work product or associated advertising placements.

The type of data for the content, advertisements, and queries can vary greatly depending one the embodiment. Data may include any type of digital file. For example, the data can include: a display program, a game, an entertainment program, a utility program, entertainment data, advertisement data, music data, pictures or a movie. Furthermore, as non-limiting examples, the data can be in any one of the following data formats: a template, a static file, a Joint Photographic Experts Group (JPEG) file, a Motion Picture Experts Group (MPEG) file, an animated GIF, a HyperText Markup Layout page, a .wav file, or a Macromedia flash file.

Instructions refer to computer-implemented steps for processing information in the system. Instructions can be implemented in software, firmware or hardware and include any type of programmed step undertaken by components of the system.

Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the processor. Other types of memory include bubble memory and core memory.

As can be appreciated by one of ordinary skill in the art, each of the modules of the invention may comprise various sub-routines, procedures, definitional statements, and macros. Each of the modules are typically separately compiled and linked into a single executable program. Therefore, the following description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

Digital music can, for example, include: MPEG Audio Layer 3 (MP3) file, a RealNetworks streaming file, Microsoft Media streaming file, or a wave file.

The networks may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, the network includes network variations such as the public Internet, a private network within the Internet, a secure network within the Internet, a private network, a public network, a value-added network, an intranet, and the like.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A media system comprising:
a content database comprising media content;
a user database comprising a plurality of user profiles;
an advertisement database comprising a plurality of advertisements; and
a media delivery module that programmatically selects first and second media content and first and second advertisements for first and second users, respectively, the first and second media content and the first and second advertisements being programmatically selected based at least in part on user profiles of the first and second users, respectively, wherein the media delivery module delivers the first media content and the first advertisement to the first user, and delivers the second media content and the second advertisement to the second user, wherein the first media content, the first advertisement, and a first query, associated with at least one of the advertisements of the advertisement database and the media content of the content database, are programmatically selected without user request based at least in part on a current physical location of the first user, and a date and/or a time when the first user is at the physical location, wherein the current physical location is dynamically communicated by a user device, and wherein the first query is interactive, permitting a response from the first user, wherein each of at least the first media content, the first advertisement and the first query are programmatically and serially arranged in discrete time slots so as to produce a personalized program for delivery to and presentation by the first user.

2. The system of claim 1, wherein the media delivery module selects the first advertisement based at least in part on the first media content.

3. The system of claim 1, wherein the advertisement database comprises an advertisement profile for each of the advertisements of the advertisement database, and the media delivery module selects the first advertisement based at least in part on a profile of the first advertisement.

4. The system of claim 3, wherein the media delivery module selects the first advertisement based at least in part on profiles of one or more advertisements other than the first advertisement.

5. The system of claim 1, wherein the content database further comprises a media content profile for each of the media contents, and the media content profiles comprise attributes of the associated media content.

6. The system of claim 1, wherein the content database further comprises a media content profile for each of the media contents, and the media content profiles comprise data related to quantity of presentations of the associated media content.

7. The system of claim 1, further comprising a query database comprising a plurality of queries associated with at least one of one of the advertisements of the advertisement database and the media content of the content database, wherein the media delivery module selects the first query and a second query for the first and second users, respectively, the first and second queries being selected without user request based at least in part on the user profiles of the first and second users, respectively, and wherein the media delivery module delivers the first query to the first user and the second query to the second user.

8. The system of claim 7, wherein the first query is an offer to sell.

9. The system of claim 7, wherein the first query is an offer for additional information.

10. The system of claim 7, further comprising a response module that stores an input from the first user, the input being in response to the first query.

11. The system of claim 10, wherein the response module adds the input to the user profile of the first user.

12. The system of claim 10, wherein the system communicates with an advertiser in response to the input.

13. The system of claim 10, wherein the response module updates at least one of an advertisement profile, one of the user profiles of the user database and a media content profile in response to the input.

14. The system of claim 7, wherein at least one of the second media content, the second advertisement, and the second query is selected based at least in part on at least one of a physical location of the second user, a date, and a time.

15. The system of claim 7, wherein the media delivery module selects one or more additional first media contents, one or more additional first advertisements, and one or more additional first queries, and generates the personalized program to be presented to the first user, the personalized program comprising the first media content, the one or more additional first media contents, the first advertisement, the one or more additional first advertisements, the first query, and the one or more additional queries.

16. The system of claim 15, wherein the media delivery module receives a user response to the first query during presentation of the personalized program.

17. The system of claim 15, wherein the media delivery module receives a user response to the first query at a time after presentation of the personalized program when the user device is in communication with the media system.

18. The system of claim 1, further comprising an authoring module that allows an author to modify selection criteria used by the media delivery module for selecting any of the first and second media content and the first and second advertisements, without user interaction.

19. The system of claim 1, further comprising:
a usage module that receives usage data from the user device, the usage data indicating any of a time, a date and a location when either of the first content and the first advertisement has been presented to the first user; and
an accounting module that calculates billing or payment information based on the usage data.

20. The system of claim 1, further comprising:
a usage module that receives usage data from one or more users, the usage data indicating aggregate usage for at least a portion of the one or more users during a period of time; and
an accounting module that calculates billing or payment information based on the usage data.

21. The system of claim 1, wherein each of the user profiles in the user database comprise a query preference.

22. The system of claim 1, wherein the media delivery module provides information in reply to an input from the first user, the input being in response to the first query.

23. The system of claim 22, wherein the media delivery module provides the information to the first user.

24. The system of claim 22, wherein the media delivery module provides information to an advertiser regarding the reply from the first user.

25. A media delivery system comprising:
a content database comprising media content;
a user database comprising a plurality of user profiles;
an advertisement database comprising a plurality of advertisements;
a media delivery module that, in response to actions from first and second users, programmatically selects first and second media content and first and second advertisements for the first and second users, respectively, the first and second advertisements being programmatically selected without user request based at least in part on user profiles of the first and second users, respectively, and on the first and second media content to be delivered, wherein the media delivery module delivers the first media content and the first advertisement to the first user, and delivers the second media content and the second advertisement to the second user, wherein the first media content, the first advertisement, and a first query, associated with at least one of the advertisements of the advertisement database and the media content of the content database, are programmatically selected without user request based at least in part on a current physical location of the first user, and a date and/or a time when the first user is at the physical location, wherein the current physical location is dynamically communicated by a user device, wherein the first query is interactive, permitting a response from the first user, wherein each of at least the first media content, the first advertisement and the first query are programmatically and serially arranged in discrete time slots so as to produce a personalized program for delivery to and presentation by the first user; and
an authoring module that allows an author to modify selection criteria used by the media delivery module for selecting any of the first and second media contents and the first and second advertisements without user interaction.

26. The system of claim 25, wherein the media delivery module selects different media content from the content database for the first and second users.

27. The system of claim 25, wherein the advertisement database comprises a profile for each of the advertisements of the advertisement database, and the media delivery module selects the first advertisement based at least in part on the profile of the first advertisement.

28. The system of claim 25, further comprising a query database comprising a plurality of queries associated with at least one of one of the advertisements of the advertisement database and the media content of the content database, wherein the media delivery module selects, without user request, the first query and a second query for the first and second users, respectively, the first and second queries being selected based at least in part on the user profiles of the first and second users, respectively, and wherein the media delivery module delivers the first query to the first user and the second query to the second user.

29. The system of claim 28, wherein the first query is an offer to sell.

30. The system of claim 28, wherein the first query is an offer for additional information.

31. The system of claim 28, further comprising a response module that stores an input from the first user, the input being in response to the first query.

32. The system of claim 25, wherein the response module adds the input to the user profile of the first user.

33. The system of claim 25, wherein the system communicates with an advertiser in response to the input.

34. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module that programmatically selects a plurality of media content, a plurality of queries and a plurality of advertisements for one of a plurality of users, wherein each of the plurality of users has a user profile in the user database, wherein the selected media content, the selected queries and the selected advertisements are independently and programmatically selected without user request based at least in part on the user profile of the one user, and wherein the media delivery module sequentially delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

35. A media system, comprising:
a content database comprising media content;
a user database comprising a plurality of user profiles;
an advertisement database comprising a plurality of advertisements;
a query database comprising a plurality of queries, each query associated with one or more of the plurality of advertisements; and
a media delivery module that programmatically selects media content, an advertisement, and a query for one of a plurality of users, wherein each of the plurality of users has a user profile in the user database, wherein the selected media content, the selected advertisement, and the selected query are programmatically selected without user request based at least in part on the user profile of the one user, and wherein the media delivery module delivers the selected media content, the selected advertisement, and the selected query to the one user, and wherein the selected query is interactive, permitting a response from the one user, wherein each of at least the selected media content, the selected advertisement and the selected query are programmatically and serially arranged in discrete time slots so as to produce a personalized program for delivery to and presentation by the one user.

36. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module that programmatically selects media content, a query and an advertisement for one of a plurality of users, wherein each of the plurality of users has a user profile in the user database, wherein the selected media content, the selected query and the selected advertisement are independently selected based at least in part on the user profile of the one user and at least one of the selected media content and the selected advertisement are programmatically selected without user request based on a current physical location of the one user when the programmatical selection is performed and a date and/or time of when the one user is at the current physical location, and wherein the media delivery module delivers the selected media content, the selected query and the selected advertisement to the one user, wherein the current physical location is dynamically communicated by a user device, wherein each of at least the selected media content, the selected advertisement and the selected query are programmatically and serially arranged in discrete time slots so as to produce a personalized program for delivery to and presentation by the one user.

37. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module that programmatically selects a plurality of media content, a plurality of queries and a plurality of advertisements for one of a plurality of users, wherein each of the plurality of users has a user profile in the user database, wherein the selected media content, the selected queries and the selected advertisements are programmatically selected without user request based at least in part on the user profile of the one user, wherein the media delivery module generates a programming sequence for the one user, wherein the programming sequence comprises the selected media content, the selected queries and the selected advertisements, and wherein the media delivery module delivers the programming sequence to the one user, wherein each of at least the selected media content, the selected advertisements and the selected queries are programmatically and serially arranged in discrete time slots so as to produce the programming sequence for delivery to and presentation by the one user.

38. An autonomous media delivery system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module that autonomously selects a plurality of media content, a plurality of queries and a plurality of advertisements for one of a plurality of users, wherein each of the plurality of users has a user profile in the user database, wherein the selected media content, the selected queries and the selected advertisements are autonomously selected without user request based at least in part on the user profile of the one user, and wherein the media delivery module autonomously sequentially delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

39. A media system, comprising:
a content database comprising media content;
a user database comprising a plurality of user profiles, each of the plurality of user profiles comprising user data collected through active user participation;
an advertisement database comprising a plurality of advertisements;
a query database comprising a plurality of queries, each query associated with one or more of the advertisements of the advertisement database and the media content of the content database; and
a media delivery module that programmatically selects a plurality of media content, a plurality of queries and a plurality of advertisements for one of a plurality of users, wherein each of the plurality of users has a user profile in the user database, wherein the selected media content, the selected queries and the selected advertisements are independently and programmatically selected without user request based at least in part on the user profile of the one user, and wherein the media delivery module sequentially delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

40. A method of delivering personalized content to a plurality of users, the method comprising:
accessing a user database comprising a plurality of user profiles;
updating a selected one of the user profiles through active participation of one of a plurality of users;
accessing a content database comprising media content;
accessing an advertisement database comprising a plurality of advertisements;
accessing a query database comprising a plurality of queries, each query associated with one or more of the advertisements of the advertisement database and the media content of the content database;
algorithmically selecting a plurality of media content, a plurality of queries and a plurality of advertisements for the selected one user, wherein the selected media content, the selected queries and the selected advertisements are algorithmically selected without user request based at least in part on the selected user profile; and
sequentially delivering the selected media content, the selected queries and the selected advertisements to the selected one user, wherein each of at least the selected media content, the selected advertisements and the selected queries are programmatically and serially arranged in discrete time slots so as to produce a personalized program for delivery to and presentation by the selected one user.

41. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module, which programmatically selects a plurality of media content, a plurality of queries and a plurality of advertisements for one of a plurality of users in data communication with the system, wherein each of the plurality of users has a user profile in the user database, wherein the selected media content, the selected queries and the selected advertisements are independently and programmatically selected without user request based at least in part on the user profile of the one user, and wherein the media delivery module delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

42. An autonomous media delivery system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module, which autonomously selects a plurality of media content, a plurality of queries and a plurality of advertisements for one of a plurality of users in data communication with the system, wherein each of the plurality of users has a user profile in the user database, wherein the selected media content, the selected queries and the selected advertisements are autonomously selected without user request based at least in part on the user profile of the one user, and wherein the media delivery module autonomously delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

43. A media system comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module, which programmatically selects, in response to actions from first and second users in data communication with the system, first and second media content, first and second queries and first and second advertisements for the first and second users, respectively, the first and second media content, the first and second queries and the first and second advertisements being programmatically selected without user request based at least in part on user profiles of the first and second users, respectively, wherein the media delivery module delivers the first media content, the first query and the first advertisement to the first user, and delivers the second media content, the second query and the second advertisement to the second user, wherein each of at least the first and second media content, the first and second advertisements and the first and second queries are programmatically arranged serially and in discrete time slots in a personalized program for delivery to and presentation by, respectively, each of the first and second users.

44. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database; and
a media delivery module, which programmatically selects media content, an advertisement, and a query for one of a plurality of users in data communication with the system, wherein each of the plurality of users has a user profile in the user database, wherein the selected media content, the selected advertisement, and the selected query are programmatically selected without user request based at least in part on the user profile of the one user, and wherein the media delivery module delivers the selected media content, the selected advertisement, and the selected query to the one user, and wherein the selected query is interactive, permitting a response from the one user, wherein each of at least the selected media content, the selected advertisement and the selected query are programmatically and serially arranged in discrete time slots so as to produce a personalized program for delivery to and presentation by the one user.

45. A media system, comprising:
a content database comprising media content;
a user database comprising a plurality of user profiles;
an advertisement database comprising a plurality of advertisements;
a query database comprising a plurality of queries, each query associated with one or more of the advertisements of the advertisement database and the media content of the content database; and
a media delivery module, which programmatically selects media content, a query and an advertisement for one of a plurality of users in data communication with the system, wherein each of the plurality of users has a user profile in the user database, wherein the selected media content, the selected query and the selected advertisement are independently selected based at least in part on the user profile of the one user, and at least one of the selected media content, the selected query and the selected advertisement are programmatically selected without user request based on a current physical location of the one user when the selection is performed and a date and/or time of when the one user is at the current physical location, wherein the media delivery module delivers the selected media content, the selected query and the selected advertisement to the one user, wherein the current physical location is dynamically communicated by a user device, wherein each of at least the selected media content, the selected advertisement and the selected query are programmatically and serially arranged in discrete time slots so as to produce a personalized program for delivery to and presentation by the one user.

46. A media system, comprising:
a content database comprising media content;
a user database comprising a plurality of user profiles, each of the user profiles comprising user data collected through active user participation;
an advertisement database comprising a plurality of advertisements;
a query database comprising a plurality of queries, each query associated with one or more of the advertisements of the advertisement database and the media content of the content database; and
a media delivery module, which programmatically selects a plurality of media content, a plurality of queries and a plurality of advertisements for one of a plurality of users in data communication with the system, wherein each of the plurality of users has a user profile in the user database, wherein the selected media content, the selected queries and the selected advertisements are independently and programmatically selected without user request based at least in part on the user profile of the one user, and wherein the media delivery module delivers the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

47. A method of delivering personalized content to a plurality of users, the method comprising:
accessing a user database comprising a plurality of user profiles;
updating a selected one of the user profiles through active participation of the one user;
accessing a content database comprising media content;
accessing an advertisement database comprising a plurality of advertisements;
accessing a query database comprising a plurality of queries, each query associated with one or more of the advertisements of the advertisement database and the media content of the content database;
algorithmically selecting a plurality of media content, a plurality of queries and a plurality of advertisements for the one user, wherein the selected plurality of media content, the selected queries and the selected advertisements are algorithmically selected without user request based at least in part on the selected user profile; and
delivering the selected media content, the selected queries and the selected advertisements to the one user, wherein each of at least the selected media content, the selected advertisements and the selected queries are programmatically and serially arranged in discrete time slots so as to produce a personalized program for delivery to and presentation by the one user.

* * * * *